United States Patent
Foch et al.

(10) Patent No.: US 7,538,501 B2
(45) Date of Patent: May 26, 2009

(54) POWER SYSTEM COMPRISING SEVERAL SYNCHRONOUS MACHINES SYNCHRONOUSLY SELF-CONTROLLED BY A CONVERTER AND CONTROL METHOD FOR SUCH A SYSTEM

(75) Inventors: Etienne Foch, Toulouse (FR); Gaetan Bisson, Toulouse (FR); Pascal Maussion, Toulouse (FR); Maria Pietrzak-David, Montastruc la Conseillere (FR); Maurice Fadel, Toulouse (FR)

(73) Assignees: Airbus France, Toulouse (FR); Centre National de la Recherche Scientifique, Paris (FR)

( * ) Notice: Subject to any disclaimer, the term of this patent is extended or adjusted under 35 U.S.C. 154(b) by 117 days.

(21) Appl. No.: 11/689,835

(22) Filed: Mar. 22, 2007

(65) Prior Publication Data
US 2007/0273310 A1 Nov. 29, 2007

(30) Foreign Application Priority Data
Mar. 24, 2006 (FR) .................................. 06 02568

(51) Int. Cl.
*H02P 1/54* (2006.01)
(52) U.S. Cl. .............................. 318/41; 318/45; 318/112
(58) Field of Classification Search .................... 318/41, 318/45, 85, 112, 113
See application file for complete search history.

(56) References Cited

U.S. PATENT DOCUMENTS

| | | | | |
|---|---|---|---|---|
| 3,757,179 A | * | 9/1973 | Pedersen | 318/85 |
| 4,456,830 A | * | 6/1984 | Cronin | 290/27 |
| 6,624,601 B2 | * | 9/2003 | Arimitsu et al. | 318/34 |
| 7,242,105 B2 | * | 7/2007 | Mehl et al. | 290/36 R |
| 2005/0206333 A1 | | 9/2005 | Prudham et al. | |

FOREIGN PATENT DOCUMENTS

| | | |
|---|---|---|
| DE | 42 04 093 A1 | 8/1993 |
| FR | 2 843 248 | 2/2004 |

OTHER PUBLICATIONS

"Copier/Printer Multiple Blower Air System", IBM Technical Disclosure Bulletin, vol. 31, No. 5, Oct. 1988, pp. 278-280.

* cited by examiner

*Primary Examiner*—Rina I Duda
(74) *Attorney, Agent, or Firm*—Oblon, Spivak, McClelland, Maier & Neustadt, P.C.

(57) ABSTRACT

A power system including at least two self-controlled synchronous machines operating in parallel synchronously, a central three-phase converter to which all these machines are connected in parallel, at least two rotor position sensors. The system also includes at least one control module that receives phase currents from each synchronous machine, signals output from position sensors, and a required reference torque value and that powers the three-phase central converter so as to slave the phase currents for each machine as a function of the required reference torque.

17 Claims, 5 Drawing Sheets

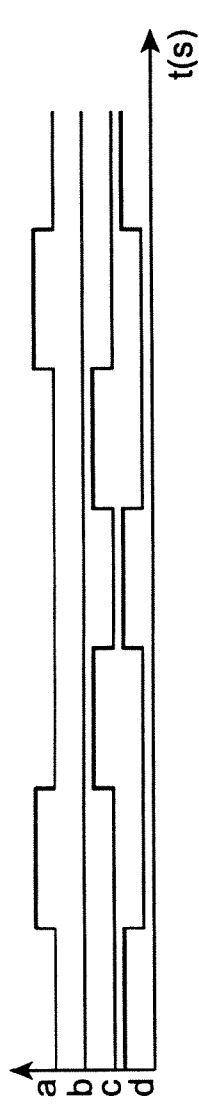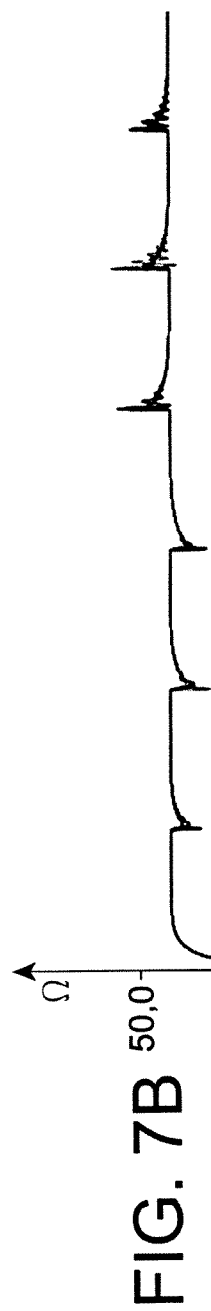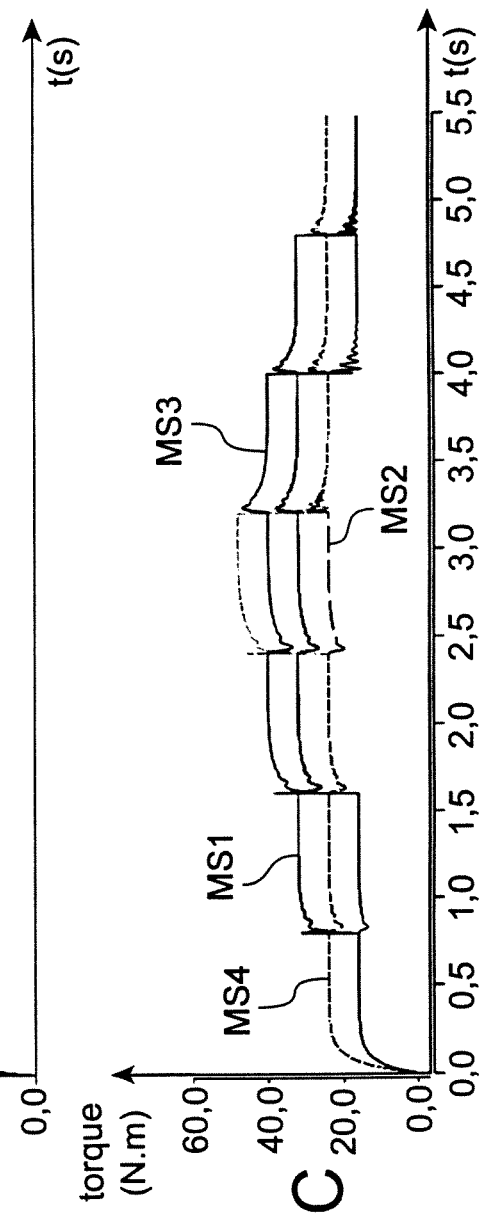
FIG. 7A
FIG. 7B
FIG. 7C

POWER SYSTEM COMPRISING SEVERAL SYNCHRONOUS MACHINES SYNCHRONOUSLY SELF-CONTROLLED BY A CONVERTER AND CONTROL METHOD FOR SUCH A SYSTEM

TECHNICAL FIELD

This invention relates to a power system comprising several synchronous machines synchronously self-controlled by a single converter and a control method for such a system, particularly in the onboard field of an aircraft, for example an airplane.

STATE OF PRIOR ART

Current aeronautical trends are leading towards more-electric aircraft. Already in some aircraft, at least one of the three flight control circuits that in previous generations were exclusively hydraulic, are now electric. Hydraulic motors are then replaced by actuators using synchronous machines with permanent magnets.

The Synchronous Machine

The choice of such synchronous machines is made due to their many advantages that overcome some of the disadvantages of DC machines. Synchronous machines with permanent magnets do not have commutators or ring and brush systems that are sources of mechanical problems, premature wear during use at high altitude, disturbances, etc. These machines can be used at higher speeds and are more robust and more reliable. Since the rotor flux is produced by magnets, the rotors are not wound. Therefore, there are no heat losses in the rotor. Since the rotor weight is also lower, the inertia of these machines is improved and higher accelerations can be obtained. This means that the power of synchronous machines per unit mass is better. These machines can also provide a torque when stopped.

All these advantages are expensive; the electronics of these synchronous machines is more advanced and more complex. Furthermore, the synchronous machine converter assembly that replaces previous solutions is more expensive. But in many aeronautical applications, the performance/cost compromise for these solutions is better.

The torque of a synchronous machine is the result of the interaction of the rotating stator magnetic field and the rotor field. When an inverter power supply is used, the stator induction field is a rotating field with speed imposed by the frequency of the inverter. In the case of an actuator with permanent magnets, the rotor is composed of continuous flux magnets. Under steady state conditions, the interaction of these two fields can only produce a torque when their speeds are identical.

Therefore under steady state conditions, it is essential that the rotor and stator fields rotate at the same speed to produce a torque. This is referred to as latching. Speed variations in the stator field are related to the dynamic performances of the power supply source, and speed variations in the rotor are limited by the characteristics of the rotating parts related to the inertia. These two dynamic characteristics are very different and synchronism between the rotor and stator fields is very difficult to maintain. Therefore, there are high risks of instability during operation at variable frequency in open loop. To overcome this, applications using synchronous machines use the principle of self-control in order to achieve a stable control and impose synchronism.

Therefore the synchronous machine with permanent magnets has to be powered by a current source in phase with the voltage induced by rotation of the rotor. One classical solution for coordinating these signals consists of using a position sensor. In this case, the inverter powers the synchronous machine that drives a position sensor. This sensor will generate three sinusoidal curves forming a balanced three-phase system that will then be driven by a control unit to control the inverter. This generates set value signals output from a regulation in phase with induced voltages and thus slaves the stator field to the rotor field. The angle between these two fields, which is one of the torque control magnitudes, can then be imposed.

Therefore in the aeronautical field, synchronous machines occupy an increasingly important position in the design of actuators. More and more functions that used hydraulic motors are now replaced by electrically powered actuators:
- either by electro-hydraulic actuators (EHA), in which a pump driven by a synchronous machine actuates a hydraulic jack. Such a solution has been adopted for the emergency system for some flight controls.
- or by electro-hydraulic actuators (EBHA), in which a pump driven by a synchronous machine with permanent magnets recreates a local hydraulic network that supplies hydraulic jacks in a complete system through servovalves. Such a solution has been adopted for the braking system for some aircraft.

Power is supplied through the electrical network with hydraulic conversion through the pump then mechanical conversion through the jack. Emerging future trends appear to be leading towards electromechanical actuators (EMA) that convert electrical energy to the mechanical actuator directly without passing through a hydraulic stage.

Many aeronautical systems use several synchronous machines, these systems associating the different motors with independent power supplies and control structures specific to each. A classical system comprises a three-phase inverter for each machine to be controlled.

Multi-Machine Systems

There are two types of multi-machine systems in prior art, namely parallel systems and multi-inverter systems.

The first category of multi-machine power supplies is composed of a standard three-phase inverter that powers several three-phase asynchronous machines connected in parallel. The inverter then imposes the same system of three-phase voltages on each machine: the operation of each machine is then identical. The number of power components used to power machines is then reduced.

The second category associates a three-phase inverter with each asynchronous machine. All converters are then powered by a DC source. This structure can result in a fully independent operation on machines because three-phase voltage systems are generated by different inverters. The number of switches is then maximum.

In a structure in the first category, illustrated in FIG. 1 and described in document reference [1] at the end of the description, the system combines two asynchronous machines MA1 and MA2 in parallel, powered by a three-phase inverter 10. This inverter is composed of three arms using switches with three two-directional segments in current and controlled in cut-in and in cut-out. This document relates to the field of railway traction in which two asynchronous machines drive a traction bogie. A synchronous motor can produce a constant electro-magnetic torque over a wide range of rotation speeds. Thus, the same torque can be guaranteed for the two similar motors connected in parallel, even when their speeds are different, for example in a turn. This does not cause a problem in railway traction considering that the difference between motor speeds remains small. Furthermore, the large masses of cars are such that accelerations are slow. Thus, if the load torque applied to each motor is identical, the motors will have the same behaviour and the system will operate ideally.

Putting two asynchronous machines into parallel on an inverter imposes two identical three-phase systems. The machines are linked and the same voltages (frequencies and moduli) are imposed. This structure is particularly attractive due to its gain in the number of semiconductors, and imposes an identical speed on all machines connected to the inverter under steady state conditions. Power components must switch the maximum current from a classical structure multiplied by the number of machines connected in parallel. Mutualisation of the inverter in this way, which consists of putting the power control resources in common, makes a different sizing of the inverter necessary so that it can power all the machines.

Aeronautical Multi-Machines System

Such a structure can be applied to some aeronautical multi-machine systems that have several synchronous machines (two or four) that rotate or can rotate at the same speed, like for example the flaps system.

But the technical problem of self-control then arises. It is necessary to guarantee synchronism of the stator and rotor fields to achieve stable operation, since the position of the rotor flux is given by the position of the machine. This synchronism in synchronous actuators is obtained by self-control. It appears difficult to apply this self-control to two synchronous machines in parallel on a single inverter.

The purpose of the invention is to solve this technical problem.

PRESENTATION OF THE INVENTION

The invention relates to a power system comprising at least two self-controlled synchronous machines operating in parallel synchronously, a central three-phase converter to which all these machines are connected in parallel and at least two rotor position sensors, characterised in that it comprises at least one control module that receives phase currents from each synchronous machine, signals output from position sensors and a required reference torque value and that powers the three-phase central converter so as to slave the phase currents for each machine as a function of the required reference torque.

Advantageously, each rotor position sensor is arranged between a synchronous machine and the corresponding load.

In one variant embodiment, the system comprises at least two regulation modules corresponding firstly to each synchronous machine and a selector connected to a three-phase central converter to select the machine to be controlled, and means of comparing the position of synchronous machines receiving output signals from the position sensors.

Advantageously, the central three-phase converter is a three-arm inverter.

The system according to the invention may be an onboard system of an aircraft.

The invention also relates to a control method for a power system comprising at least two self-controlled synchronous machines operating in parallel synchronously, and a three-phase central converter onto which all of these machines are connected in parallel, and at least two rotor position sensors, characterised in that the three-phase central converter is controlled as a function of the phase currents reaching each synchronous machine and signals output from position sensors, and these phase currents are slaved to each machine as a function of a required reference torque.

Advantageously, it comprises a step to select the machine with the greatest load torque, for example by comparing the position of synchronous machines.

The invention can be used onboard an aircraft, for example an airplane.

The invention relates to an aircraft comprising a system like that described above, and an aircraft with a system capable of implementing the method as defined above.

The mutualisation type defined above is applicable to all aeronautical systems with at least two synchronous machines that can or must rotate at the same speed, for example the flaps system, which has the specific feature that it requires an identical output speed of all flaps. This type of mutualisation can also be applied to other systems such as braking or air conditioning.

BRIEF DESCRIPTION OF THE DRAWINGS

FIGS. 3 to 7 shows variant embodiments of the system according to the invention.

DETAILED PRESENTATION OF PARTICULAR EMBODIMENTS

Figure 1:
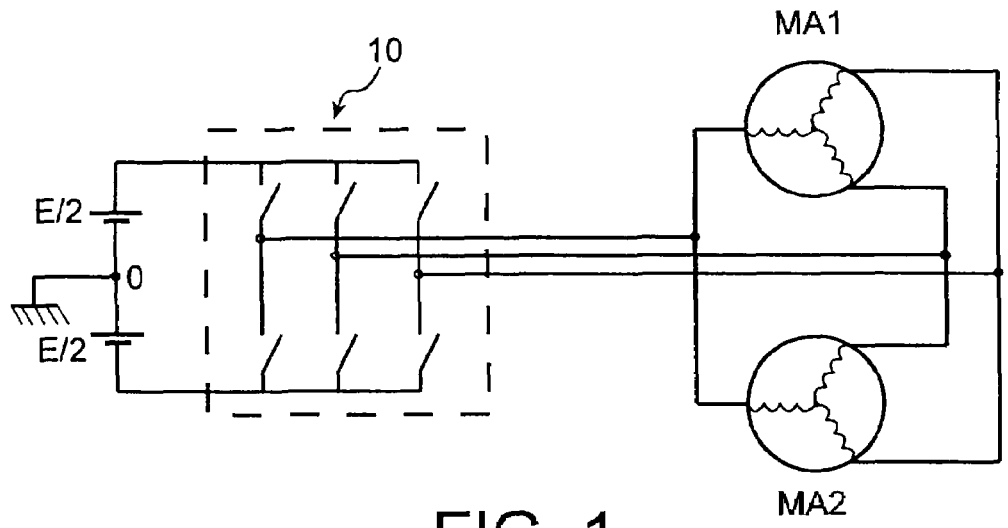
FIG. 1 shows a system according to prior art.
Figure 2:
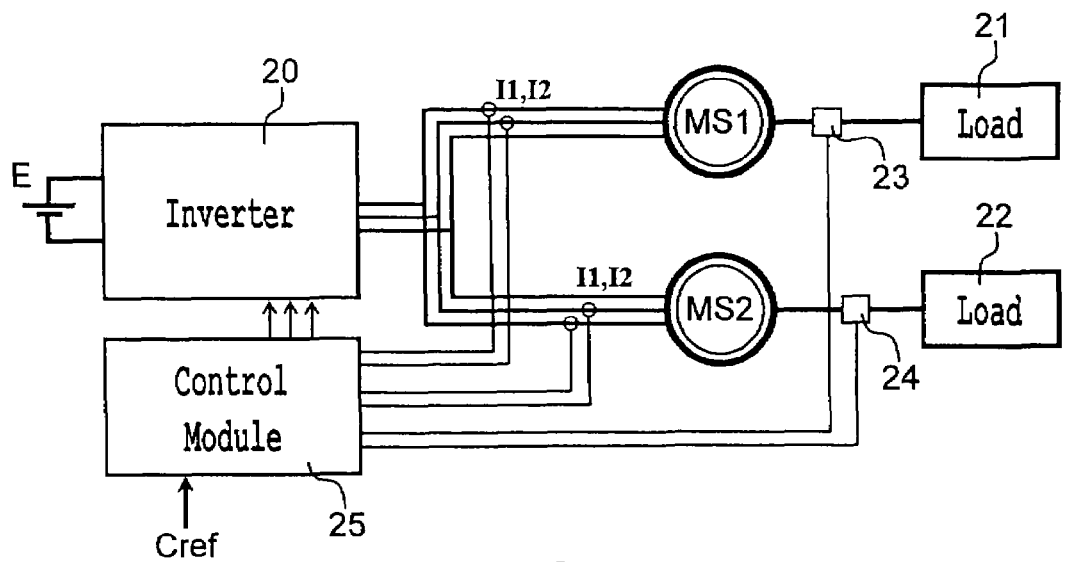
FIG. 2 shows the system according to the invention.

FIG. 2 shows the system according to the invention in which several synchronous machines, in this case two machines denoted MS1 and MS2, are connected in parallel to a single three-arm inverter 20.

A load 21 is associated with machine MS1 and a load 22 is associated with machine MS2.

Corresponding position sensors 23 and 24 are placed between each synchronous machine MS1 or MS2 and the load 21 or 22 associated with it respectively.

A control module 25, that supplies power to the inverter 20, receives the measured value of phase currents I1 and I2 input to each synchronous machine MS1 and MS2, and signals output from position sensors 23 and 24, and a value of the reference torque Cref.

The two synchronous machines MS1 and MS2 have the same voltages at their terminals. Their rotation speeds are then identical under steady state conditions. Control orders of these synchronous machines are coordinated with the position of their different rotors.

The system according to the invention can reduce the number of power components by allowing an oversizing of the power components, because the same inverter 20 supplies power to all machines.

Figure 3:
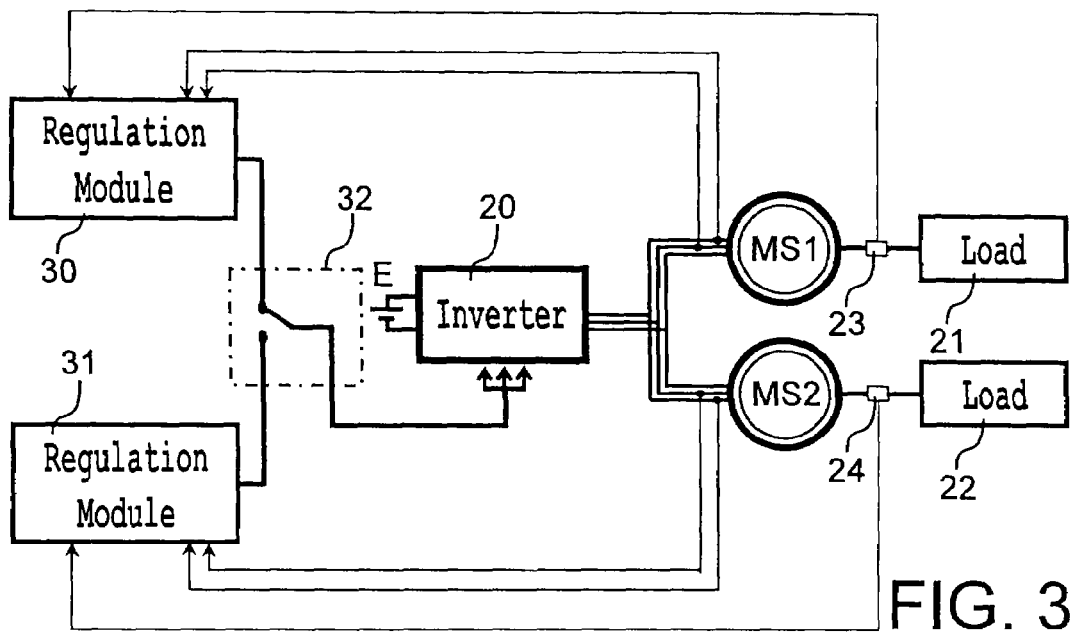

In one variant embodiment shown in FIG. 3, the system according to the invention comprises two regulation modules 30 and 31 respectively for each synchronous machine MS1 or MS2, instead of the control module 25 in FIG. 2, and a selector 32 to select the machine to be controlled.

In the system according to the invention, the control strategy consists of selecting the synchronous machine MS1 or MS2 that is actually controlled as a function of the load conditions. The two phase currents I1 and I2 for each motor are thus measured and are slaved as a function of the required reference torque Cref.

If load changes occur between the two machines MS1 and MS2, then the positions of the rotors of each machine are different. A choice of the machine to be self-controlled has to be made. Such a choice is made as a function of the measurement/observation of the machines position. The invention then consists of self-controlling the machine with the highest load, which satisfies the condition for stable control. This choice can be made as a function of the internal electrical angles of the machines, in other words as a function of the comparison of the positions of these machines MS1 and MS2.

Therefore stable control of these two machines is achieved by controlling their load, because all that can be imposed is that the angles δ between the voltage at the terminals of these machines and their e.m.f. (electromotive force) are not less than π/2. The machine with the lowest load torque will be chosen as the machine that will not be self-controlled and not regulated. Therefore, the machine with the highest load torque is controlled.

Several solutions are possible for applying self-control and for regulating the machine with the highest resisting torque:

A first solution is to fit a torque sensor on each machine and to compare the two torques to control operation. But such a solution is expensive.

A second solution is to make an observer of the setting angle $\psi_2$ for machine MS2, this so-called setting angle $\psi_2$ representing the positive phase shift between the electro-motive force and the current vector. If this angle $\psi_2$ is positive, the two machines are in a stable operating condition. But if this angle becomes negative, then the self-controlled machine has to be changed and therefore the selector 32 has to be switched over. This is valid for a zero imposed setting angle $\psi_1$ (for machine MS1).

Figure 4:
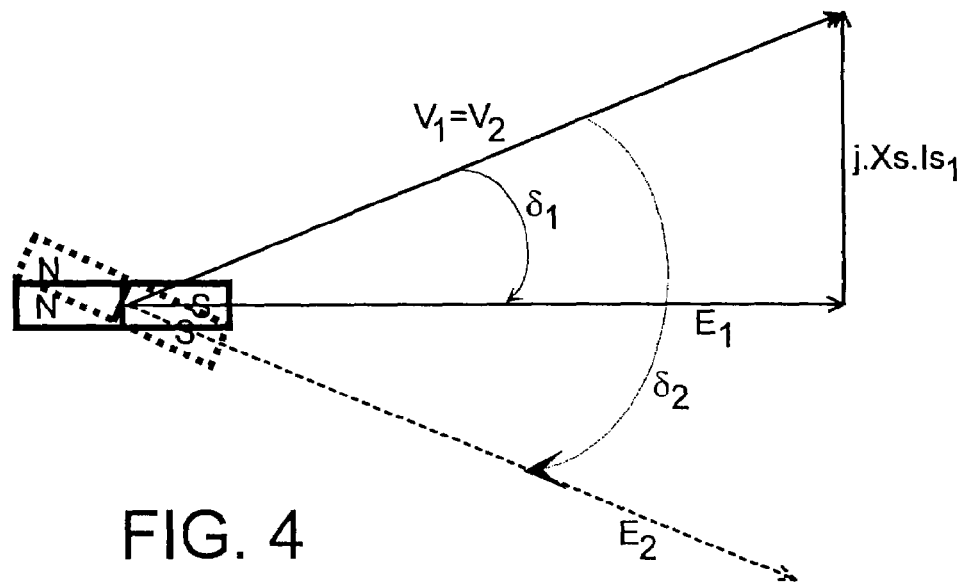

A third solution consists of comparing the angles $\delta_1$ and $\delta_2$ and self-controlling the machine with the largest angle δ. These angles δ represent the phase shift between the stator voltage common to the two machines MS1 and MS2 and the e.m.f. Ei. Therefore comparing between these two angles is equivalent to comparing the angle between the two values of the e.m.f. equal to E1 and E2, which are invariably related to the magnets of the two machines and therefore to the positions of their rotors, as shown in FIG. 4, this figure illustrating the vector diagram for the synchronous machine MS1 (Is1=current in the stator winding of the machine MS1).

The rotor positions are known because the two machines MS1 and MS2 are fitted with position sensors 23 and 24 for self-control. Therefore there is no need to equip these machines with additional sensors.

Figure 5:
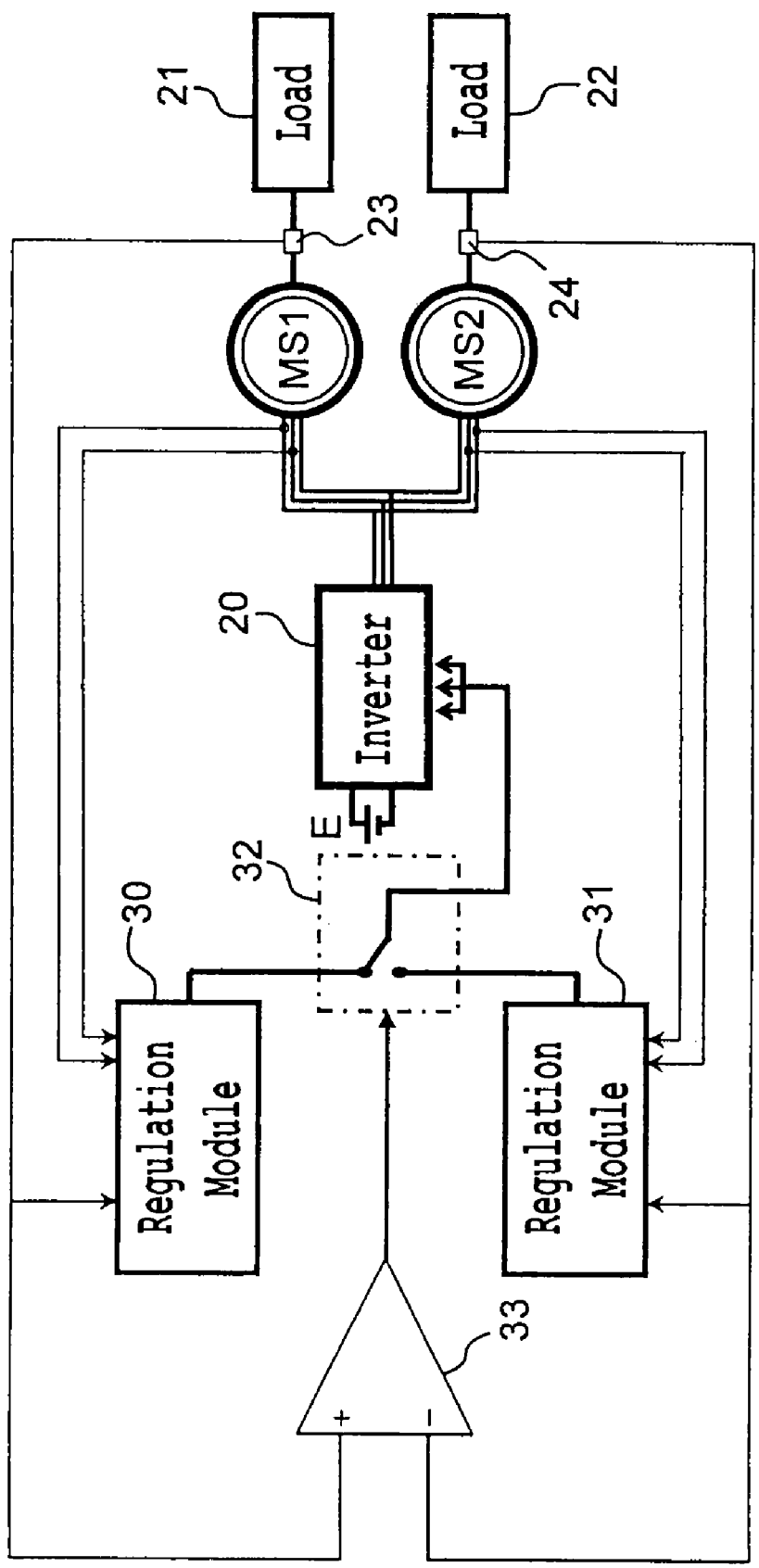

In another variant embodiment shown in FIG. 5, the machine to be self-controlled is chosen by using a comparator 33 to compare the positions of the two machines MS1 and MS2.

A combination of the two synchronous machines MS1 and MS2 considered above may be extended to a combination of a larger number of synchronous machines, for example four machines MS1, MS2, MS3 and MS4. Such a solution is then applicable to the flaps system of an airplane.

Figure 6:
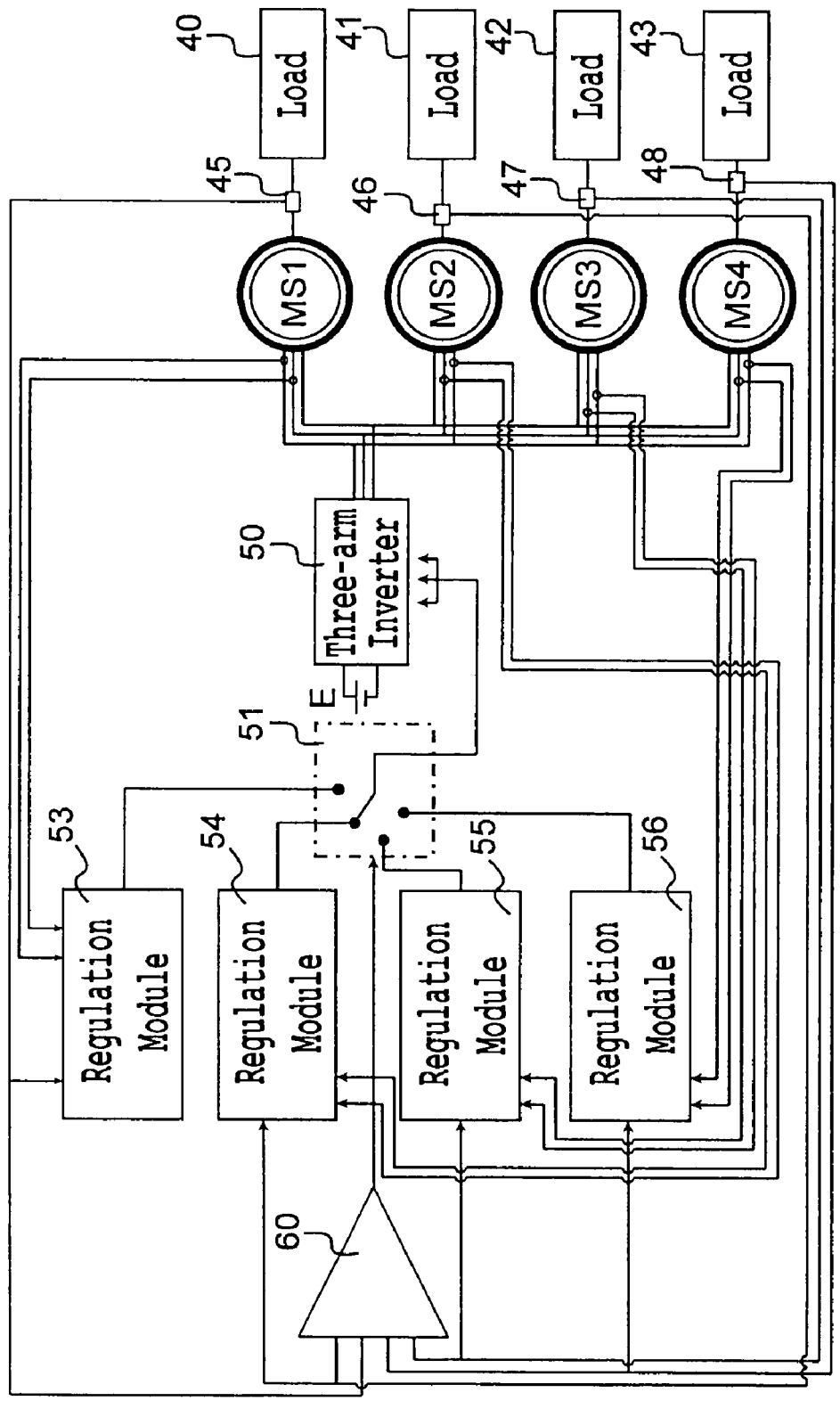

The diagram in FIG. 6 shows an association of four synchronous machines MS1, MS2, MS3, MS4 in parallel. This figure also shows:
loads 40, 41, 42, 43,
position sensors 45, 46, 47, 48,
a three-arm inverter 50,
a selector 51,
regulation modules 53, 54, 55, 56,
a position comparator 60.

A single speed control is imposed on the four synchronous machines MS1, MS2, MS3 and MS4. The choice of the machine to be self-controlled is made by comparing the position of all machines, so that the machine with the highest resistant torque can thus be determined.

The curves in FIG. 7A show signals a, b, c, d, corresponding to each machine. Only one of these signals is equal to "one" at any given instant. The signal that is equal to "one" represents the selected machine. FIG. 7B shows the angular speeds of the different machines. FIG. 7C shows the torques of these machines.

These FIGS. 7A, 7B and 7C correspond to one particular example defined so as to have a maximum number of switchings.

These FIGS. 7A, 7B and 7C demonstrate the variation of the torque and speed of the four machines in the presence of load variations. At any moment, only one of the four signals a, b, c, d is equal to "one" to signal the controlled machine, the three others being slaved to this controlled machine.

REFERENCES

[1] Thesis presented for a Doctorate at the Toulouse Institut National Polytechnique by Rosendro Penã Equiluz, Nov. 8, 2002 entitled <<Commande algorithmique d'un système mono-onduleur bimachine asynchrone destiné à la traction ferroviaire>> (Algorithmic control of a single-inverter dual asynchronous machine system designed for railway traction).

The invention claimed is:

1. A power system comprising:
at least two self-controlled synchronous machines operating in parallel synchronously,
a three-phase central converter onto which all of said self-controlled synchronous machines are connected in parallel,
at least two position sensors configured to output position signals corresponding to positions for said self-controlled synchronous machines, and
at least one control module that receives phase currents from each of said synchronous machines, said position signals output from said position sensors and a required reference torque value, and wherein said control module powers, based on said phases currents, said position signals and on said reference torque value, the three-phase central converter so as to slave the phase currents for each synchronous machine as a function of the reference torque value.

2. A system according to claim 1, wherein each rotor position sensor is arranged between a synchronous machine and the corresponding load.

3. A system according to claim 1, comprising at least two regulation modules, a first regulation module corresponding to a first synchronous machine and a second regulation module corresponding to a selector connected to the three-phase central converter to select one of said synchronous machines to be controlled.

4. A system according to claim 2, comprising means for comparing a position of said synchronous machines, wherein said means for comparing receive said position signals from the position sensors.

5. A system according to claim 1, wherein the central three-phase converter is an inverter.

6. A system according to claim 1, wherein said synchronous machines are aircraft components and wherein said system is onboard an aircraft.

7. An aircraft comprising a plurality of flaps wherein the flaps are controlled by a flap system, wherein said flap system is a system according to claim 1.

8. A system according to claim 1, wherein said at least two self-controlled synchronous machines include four self-controlled synchronous machines.

9. A system according to claim 1, wherein said control module is configured to select, as a function of load conditions, one of the synchronous machines to be controlled.

10. A system according to claim 9, wherein said control module is configured to select said one of the synchronous machines when load changes occur between the synchronous machines such that positions for the synchronous machines become different from each other.

11. A system according to claim 10, wherein said control module is configured to not select a synchronous machine having the lowest load torque among the synchronous machines.

12. A system according to claim 11, wherein said control module is configured to select a synchronous machine having the highest load torque among the synchronous machines.

13. A system according to claim 1, wherein said synchronous machines comprise aircraft rotors and said position sensors are configured to output rotor position signals corresponding to positions of said aircraft rotors.

14. A control method for a power system comprising at least two self-controlled synchronous machines operating in parallel synchronously, and a three-phase central converter onto which all of said synchronous machines are connected in parallel, and at least two rotor position sensors, said method comprising the steps of:
   controlling the three-phase central converter as a function of the phase currents reaching each synchronous machine and signals output from the rotor position sensors, and
   slaving said phase currents for each synchronous machine as a function of a required reference torque.

15. A method according to claim 14, further comprising a step of selecting one of the synchronizing machines with the greatest load torque.

16. A method according to claim 15, wherein the step of selecting the synchronous machine with the greatest load torque includes comparing position of synchronous machines.

17. A control method according to claim 14, implemented onboard an aircraft.

* * * * *